(12) United States Patent
Moncrief

(10) Patent No.: US 7,856,751 B1
(45) Date of Patent: Dec. 28, 2010

(54) DUAL PURPOSE FISHING TOOL

(75) Inventor: Frank Moncrief, Acworth, GA (US)

(73) Assignee: Alien Products, Incorporated, Acworth, GA (US)

( * ) Notice: Subject to any disclaimer, the term of this patent is extended or adjusted under 35 U.S.C. 154(b) by 142 days.

(21) Appl. No.: 11/853,754

(22) Filed: Sep. 11, 2007

Related U.S. Application Data

(60) Provisional application No. 60/886,120, filed on Jan. 23, 2007.

(51) Int. Cl.
*A01K 97/18* (2006.01)
*A01K 97/00* (2006.01)

(52) U.S. Cl. .................................. 43/4; 43/53.5; 7/106

(58) Field of Classification Search ................ 43/4, 43/53.5, 43.12; 7/106; 30/366; 83/866; 604/272, 239, 181, 182, 192, 199; 157/13
See application file for complete search history.

(56) References Cited

U.S. PATENT DOCUMENTS

| | | | | |
|---|---|---|---|---|
| 430,299 | A | * | 6/1890 | Rand ........................... 30/366 |
| 445,380 | A | * | 1/1891 | Philip .......................... 30/366 |
| 498,094 | A | * | 5/1893 | Verharen .................... 43/53.5 |
| 578,043 | A | * | 3/1897 | Pascoe .......................... 7/106 |
| 787,064 | A | * | 4/1905 | Welter ......................... 30/366 |
| 824,867 | A | * | 7/1906 | Houghton .................... 30/366 |
| 987,355 | A | * | 3/1911 | Godwin ....................... 30/366 |
| 1,150,387 | A | * | 8/1915 | Roberts ....................... 452/69 |
| 1,259,335 | A | * | 3/1918 | Acton .......................... 30/366 |
| 1,475,301 | A | * | 11/1923 | Hartleb ........................... 7/106 |
| 1,485,253 | A | * | 2/1924 | Devlin .......................... 30/366 |
| 1,777,695 | A | * | 10/1930 | Jeffery ........................ 43/53.5 |
| 1,825,077 | A | * | 9/1931 | Lawrence .................... 30/140 |
| 2,050,194 | A | * | 8/1936 | Pflueger ..................... 43/53.5 |
| 2,054,236 | A | * | 9/1936 | Behr ........................... 43/53.5 |
| 2,348,662 | A | * | 5/1944 | Stevens ...................... 43/53.5 |
| 2,370,958 | A | * | 3/1945 | Hellier ......................... 156/87 |
| 2,414,911 | A | * | 1/1947 | Temple ........................ 222/81 |
| 2,571,590 | A | * | 10/1951 | Logic ........................... 222/86 |
| 2,578,289 | A | * | 12/1951 | Danielson ................... 43/53.5 |
| 2,589,976 | A | * | 3/1952 | Steele ......................... 43/53.5 |
| 2,662,331 | A | * | 12/1953 | Borup ......................... 43/53.5 |
| 2,688,816 | A | * | 9/1954 | Bondesen ................... 43/53.5 |
| 2,718,082 | A | * | 9/1955 | Limacher .................... 43/53.5 |
| 2,722,080 | A | * | 11/1955 | Lemberger .................. 43/53.5 |
| 2,724,207 | A | * | 11/1955 | Miller et al. ................. 43/53.5 |

(Continued)

FOREIGN PATENT DOCUMENTS

GB 2384963 A * 8/2003

(Continued)

OTHER PUBLICATIONS

"ARC Dehookers", htttp://www.dehooker4arc.com.

(Continued)

*Primary Examiner*—Darren W Ark
(74) *Attorney, Agent, or Firm*—Steve M. McLary; Justin R. Jackson; Peacock Myers, P.C.

(57) ABSTRACT

A dual purpose fishing tool which includes an elongated handle portion. One end of the handle portion has attached to it a fishhook-removing portion. The opposite end of the handle has a fish bladder venting needle attached thereto.

2 Claims, 7 Drawing Sheets

U.S. PATENT DOCUMENTS

| | | | |
|---|---|---|---|
| 2,749,653 A * | 6/1956 | Patrowsky et al. | 43/53.5 |
| 2,781,599 A * | 2/1957 | Steiner | 43/53.5 |
| 2,786,528 A * | 3/1957 | Wick | 30/366 |
| 2,793,463 A * | 5/1957 | Nieman | 43/53.5 |
| 2,795,887 A * | 6/1957 | Lockert | 43/53.5 |
| 2,797,523 A * | 7/1957 | Dillard | 43/53.5 |
| 2,836,003 A * | 5/1958 | Schumacker | 43/53.5 |
| 2,887,817 A * | 5/1959 | Sharpe | 43/53.5 |
| 2,892,284 A * | 6/1959 | Shawhan | 43/53.5 |
| 2,897,626 A * | 8/1959 | Buller | 43/53.5 |
| 2,929,432 A * | 3/1960 | Funk et al. | 152/415 |
| 2,931,125 A * | 4/1960 | Planin | 43/53.5 |
| 2,932,117 A * | 4/1960 | Wear | 43/53.5 |
| 2,947,106 A * | 8/1960 | Lewan | 43/53.5 |
| 2,948,979 A * | 8/1960 | Kulp | 43/4 |
| 2,958,977 A * | 11/1960 | May | 43/53.5 |
| RE24,902 E * | 12/1960 | Dillard | 43/53.5 |
| 2,998,670 A * | 9/1961 | Edwards | 43/53.5 |
| 3,011,286 A * | 12/1961 | Wallace | 43/53.5 |
| 3,034,252 A * | 5/1962 | Basinski | 43/53.5 |
| 3,050,896 A * | 8/1962 | Parker | 43/4 |
| 3,076,457 A * | 2/1963 | Copen | 604/272 |
| 3,133,345 A * | 5/1964 | Shaw | 43/4 |
| 3,154,985 A * | 11/1964 | Hermanns | 83/868 |
| 3,277,893 A * | 10/1966 | Clark | 604/130 |
| 3,349,821 A * | 10/1967 | Moeller | 30/366 |
| 3,352,013 A * | 11/1967 | Fuller et al. | 30/368 |
| 3,374,570 A * | 3/1968 | Lenzen | 43/53.5 |
| 3,382,577 A * | 5/1968 | Rieder | 30/366 |
| 3,395,704 A * | 8/1968 | Frey et al. | 30/366 |
| 3,397,479 A * | 8/1968 | Tyjewski | 43/53.5 |
| 3,403,466 A * | 10/1968 | Young | 43/4 |
| 3,419,924 A * | 1/1969 | Archibald | 43/53.5 |
| 3,448,520 A * | 6/1969 | Fuller et al. | 30/366 |
| 3,451,157 A * | 6/1969 | Jones | 43/53.5 |
| 3,500,576 A * | 3/1970 | Ostrom | 43/43.12 |
| 3,555,718 A * | 1/1971 | Montgomery | 43/53.5 |
| 3,588,078 A * | 6/1971 | Van De Sande | 43/53.5 |
| 3,603,021 A * | 9/1971 | Nunley | 43/53.5 |
| 3,648,399 A * | 3/1972 | Lloyd | 43/43.12 |
| 3,721,034 A * | 3/1973 | Collins | 43/53.5 |
| 3,797,112 A * | 3/1974 | Paulson | 30/366 |
| 3,811,217 A * | 5/1974 | Watkins | 43/53.5 |
| 3,825,961 A * | 7/1974 | Klein | 7/106 |
| 4,045,904 A * | 9/1977 | Lore | 43/53.5 |
| 4,073,083 A * | 2/1978 | Davis | 43/4 |
| 4,118,881 A * | 10/1978 | McFarlane | 43/4 |
| 4,127,957 A * | 12/1978 | Bourquin et al. | 43/53.5 |
| 4,129,955 A * | 12/1978 | Schommer | 43/4 |
| 4,206,561 A * | 6/1980 | Wong et al. | 43/53.5 |
| 4,342,171 A * | 8/1982 | Cripps et al. | 43/53.5 |
| 4,403,797 A * | 9/1983 | Ragland, Jr. | 43/4 |
| 4,473,966 A | 10/1984 | Neal | |
| 4,590,702 A * | 5/1986 | Chestnutt | 43/53.5 |
| 4,674,220 A * | 6/1987 | Bearce et al. | 43/4 |
| 4,706,403 A * | 11/1987 | Reynolds | 43/4 |
| 4,709,498 A * | 12/1987 | Wolski | 43/4 |
| 4,713,886 A * | 12/1987 | Ikeda | 30/366 |
| 4,833,817 A * | 5/1989 | Silverthorn | 43/53.5 |
| 4,848,019 A * | 7/1989 | Toogood | 43/4 |
| 4,881,337 A * | 11/1989 | Mehl | 43/4 |
| 4,914,853 A * | 4/1990 | Swindle | 43/53.5 |
| 4,915,631 A * | 4/1990 | Robinson et al. | 43/4 |
| 5,099,579 A * | 3/1992 | Chadwick | 30/366 |
| 5,119,585 A * | 6/1992 | Camp | 43/53.5 |
| 5,125,180 A * | 6/1992 | Dean | 43/4 |
| 5,136,744 A * | 8/1992 | Allsop et al. | 43/4 |
| 5,155,930 A * | 10/1992 | Monarez | 43/4 |
| 5,250,066 A * | 10/1993 | Lambert | 604/272 |
| 5,274,948 A * | 1/1994 | Harrison et al. | 43/53.5 |
| 5,283,920 A * | 2/1994 | Plummer | 43/4 |
| 5,307,586 A * | 5/1994 | Palmer | 43/53.5 |
| 5,478,316 A * | 12/1995 | Bitdinger et al. | 604/192 |
| 5,548,917 A * | 8/1996 | Holwadel | 43/1 |
| 5,557,874 A * | 9/1996 | Pietrandrea et al. | 43/4 |
| 5,600,914 A * | 2/1997 | Tatar | 43/4 |
| 5,784,830 A * | 7/1998 | Brumfield | 43/53.5 |
| 5,967,012 A * | 10/1999 | Dummer et al. | 83/451 |
| 5,983,555 A * | 11/1999 | Biel | 43/53.5 |
| 6,026,607 A * | 2/2000 | Bukowski | 43/4 |
| 6,038,808 A * | 3/2000 | Bergeron et al. | 43/53.5 |
| 6,065,238 A * | 5/2000 | Carter et al. | 43/4 |
| 6,205,698 B1 * | 3/2001 | Richards | 43/53.5 |
| 6,223,441 B1 * | 5/2001 | Parsons | 30/366 |
| 6,240,673 B1 | 6/2001 | Shelton | |
| 6,272,788 B1 | 8/2001 | Bergacker | |
| 6,305,118 B1 * | 10/2001 | Wacha | 43/4 |
| 6,393,756 B1 * | 5/2002 | Forney et al. | 43/42.06 |
| 6,397,513 B1 * | 6/2002 | Reed | 43/53.5 |
| 6,421,949 B1 * | 7/2002 | Schytte | 43/43.12 |
| 6,434,878 B1 * | 8/2002 | Milton | 43/4 |
| 6,550,177 B1 * | 4/2003 | Epple, Jr. | 43/4 |
| 6,560,913 B1 * | 5/2003 | Liao | 43/53.5 |
| 6,625,920 B1 * | 9/2003 | Rockwell | 43/4 |
| 6,676,638 B2 * | 1/2004 | Takagi et al. | 604/192 |
| 6,679,199 B2 * | 1/2004 | Bankston | 43/4 |
| 6,681,513 B2 * | 1/2004 | Hill | 43/4 |
| 6,705,042 B1 | 3/2004 | Harrison | |
| 6,715,804 B2 * | 4/2004 | Beers | 43/4 |
| 6,769,212 B2 * | 8/2004 | Grayson | 43/4 |
| 6,846,302 B2 * | 1/2005 | Shemesh et al. | 604/192 |
| 6,880,252 B1 * | 4/2005 | Drake | 30/366 |
| 6,884,237 B2 * | 4/2005 | Asbaghi | 604/192 |
| 6,898,891 B1 * | 5/2005 | Needham | 43/4 |
| 6,926,696 B2 * | 8/2005 | Mohammed | 604/272 |
| 7,076,910 B1 * | 7/2006 | Xifra | 43/4 |
| 7,223,259 B2 * | 5/2007 | Marshall et al. | 604/192 |
| 7,393,344 B2 * | 7/2008 | Mohammed | 604/272 |
| 7,407,492 B2 * | 8/2008 | Gurtner | 604/181 |
| 7,412,914 B2 * | 8/2008 | Al-Majed | 30/366 |
| 7,434,350 B1 * | 10/2008 | Gomez et al. | 43/53.5 |
| 7,444,779 B2 * | 11/2008 | Hei | 43/53.5 |
| 7,478,497 B2 * | 1/2009 | Otsuka et al. | 43/4 |
| 7,524,308 B2 * | 4/2009 | Conway | 604/192 |
| 7,676,982 B1 * | 3/2010 | Lee | 43/4 |
| 2001/0016713 A1 * | 8/2001 | Takagi et al. | 604/192 |
| 2002/0004652 A1 * | 1/2002 | Asbaghi | 604/192 |
| 2002/0017048 A1 * | 2/2002 | Lam | 43/4 |
| 2002/0082560 A1 * | 6/2002 | Yang | 604/181 |
| 2002/0082564 A1 * | 6/2002 | Pham | 604/192 |
| 2003/0029075 A1 * | 2/2003 | Hebard | 43/53.5 |
| 2003/0163091 A1 * | 8/2003 | Bush et al. | 604/181 |
| 2004/0025408 A1 * | 2/2004 | Newman, Sr. | 43/53.5 |
| 2004/0204688 A1 * | 10/2004 | Lin et al. | 604/192 |
| 2006/0195062 A1 * | 8/2006 | Gremel | 604/192 |
| 2006/0264825 A1 * | 11/2006 | Westbye et al. | 604/192 |
| 2007/0078403 A1 * | 4/2007 | Millerd | 604/192 |
| 2007/0089355 A1 * | 4/2007 | Burgett, Sr. | 43/53.5 |
| 2007/0173772 A1 * | 7/2007 | Liversidge | 604/192 |
| 2007/0199229 A1 * | 8/2007 | Carder et al. | 43/4 |
| 2007/0277424 A1 * | 12/2007 | Hale et al. | 43/4 |
| 2008/0110077 A1 * | 5/2008 | Callaway | 43/4.5 |
| 2008/0177235 A1 * | 7/2008 | DiBiasi | 604/192 |
| 2008/0236019 A1 * | 10/2008 | Gollahon | 43/4 |
| 2008/0301998 A1 * | 12/2008 | Gallo | 43/53.5 |
| 2009/0025273 A1 * | 1/2009 | Gauger | 43/53.5 |
| 2009/0069751 A1 * | 3/2009 | Curtis et al. | 604/272 |
| 2009/0105661 A1 * | 4/2009 | Chevallier et al. | 604/192 |
| 2009/0149836 A1 * | 6/2009 | Teachout et al. | 119/200 |
| 2010/0000141 A1 * | 1/2010 | Cooksey et al. | 43/4 |

| | | | | | | | | |
|---|---|---|---|---|---|---|---|---|
| 2010/0005698 | A1 | * | 1/2010 | Raus | ..................... | 43/4 | JP | 2008005772 A * 1/2008 |

FOREIGN PATENT DOCUMENTS

| | | | | |
|---|---|---|---|---|
| JP | 04237448 A | * | 8/1992 | |
| JP | 07155097 A | * | 6/1995 | |
| JP | 07227188 A | * | 8/1995 | |
| JP | 10286053 A | * | 10/1998 | |
| JP | 10295247 A | * | 11/1998 | |
| JP | 2000041559 A | * | 2/2000 | |
| JP | 2001045944 A | * | 2/2001 | |
| JP | 2001299175 A | * | 10/2001 | |
| JP | 2005230017 A | * | 9/2005 | |
| JP | 2005253375 A | * | 9/2005 | |

OTHER PUBLICATIONS

"Exactus Fish Hook Remover", http://www.tackletactics.co.nz/Hookremovers.html.
"Hook Remover", http://www.jannsnetcraft.com.
"Pre-Vent", http://www.teammarineusa.us/.
"The Flippin' Stick Fish Hook Remover", http://www.flippinstick.com.
"Venting Tool", http://www.outdoorsbest.zeroforum.com/zerothread?id=593893.

* cited by examiner

DUAL PURPOSE FISHING TOOL

CROSS REFERENCE TO RELATED APPLICATIONS

This application claims the benefit of U.S. Provisional Patent Application No. 60/886,120 filed Jan. 23, 2007, entitled "Fish Hook Remover and Venting Tool", to Moncrief which is hereby incorporated by reference in its entirety.

BACKGROUND OF THE INVENTION

Many species of fish that are sought for food and sport have gas-filled floatation bladders for the purpose of maintaining a fish's neutral buoyancy. In particular, those species of saltwater fish which live near the ocean bottom adjacent to natural or artificial reef structures are targeted by both commercial and sport fishermen and have such floatation bladders. Such fish are often caught on or near the bottom, in deeper water, and when the fish is brought rapidly to the surface, the gas in the floatation bladder expands. If these fish are released, the over-inflated floatation bladder will not allow the fish to swim properly or submerge to return to the bottom. The fish is then exposed to predators, is unable to feed, and is exposed to damage by the sun. In these circumstances, the likelihood of the fish surviving is small.

In recent years, regulations regarding the size and quantity of most reef-fish have increased the frequency of fish that are caught and then released back into the water. Prior to release, the fishhook must be removed from the fish's' mouth. Fishhook removal is usually accomplished using a tool of some sort; pliers are often used and more specialized tools are commercially available.

Studies have shown that survivability of fish with gas-filled bladders that are caught in deep water increases if the fish's bladder is properly vented. Venting is often performed using any sharp object that comes to hand on a boat, such as a knife or the tip of a gaff. Although these methods allow the gas to escape, such methods are inappropriate since they produce too large a hole and penetration is difficult to control. The resulting oversized wound reduces the likelihood that the fish will survive. Venting these species is properly done using a device such as a hypodermic needle. Although hypodermic needles are effective, they are specialized tools, are somewhat fragile, and, due to their sharpness, must be put away after each use. Further, the pace of the type of fishing that produces catches of these species is often quite hectic, thus the hook removal and venting operations must be performed fairly rapidly and the equipment must be capable of absorbing some abuse.

Accordingly, a venting tool is needed that is durable, easy to use, and maximizes the likelihood of the survival of the released fish.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

BRIEF SUMMARY OF THE INVENTION

Figure 1:
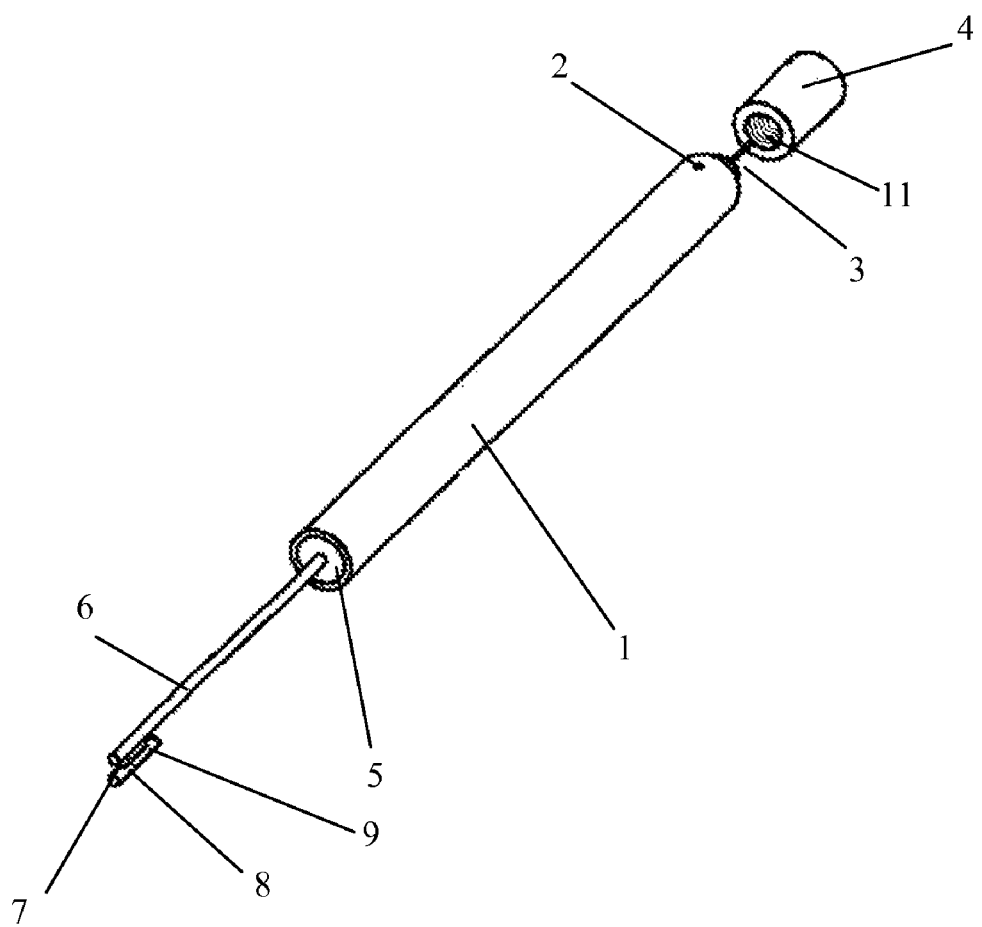
FIG. 1 is an isometric view of a configuration of the preferred embodiment of the invention.
Figure 2:
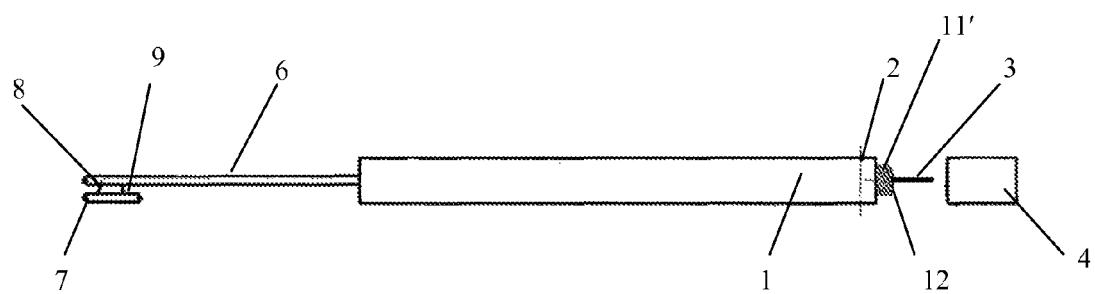
FIG. 2 is a side view of the FIG. 1 embodiment.

The present invention combines, into one tool, a durable and effective hook removal apparatus with a more robust venting tool.

The invention is a dual purpose fishing tool having an elongated handle portion, a hook removing portion mounted on one end of the handle portion, and a fish bladder venting needle mounted on the opposite end of the handle portion.

In one embodiment, the hook-removing portion comprises an elongated shaft, smaller in cross section than the handle portion, and extending away from the handle portion. A generally "J" shaped portion is attached to the end of the elongated shaft remote from the handle portion. The handle portion may be hollow and the elongated shaft may be connected to a plug secured in the hollow handle portion. In this embodiment, the venting needle may be a hollow cannula. In this case, a cross drilled hole connects the plug, the handle portion, and the hollow cannula In a further embodiment, a removable cover covers the venting needle, and the handle portion is hollow. The venting needle is connected to a plug, which is secured in the hollow handle portion. The removable cover and the plug are threaded to allow the removable cover to be screwed on and off the plug, thereby covering or uncovering the venting needle. In this embodiment, the venting needle may be a hollow cannula. In this case, a cross drilled hole connects the handle portion, the plug, and the hollow cannula.

In another embodiment, the handle portion has an opening formed in the end where the venting needle is mounted. An extension spring is mounted in the opening in the handle portion and held in place by a pin that extends through the handle portion. A sleeve and pin attached to the opposite end of the spring connect the venting needle to the extension spring. The extension spring acts to keep the venting needle in a normally retracted position within the handle portion. An elongated slot is formed in the handle portion and connects to the opening. A slide lever is positioned in the elongated slot and is movable along the elongated slot. The slide lever is connected to the sleeve. Movement of the slide lever moves the venting needle in and out of the opening in the handle portion. The needle may be a hollow cannula.

In yet another embodiment, a compression spring is mounted on the handle portion on the end carrying the venting needle. In this embodiment, the handle portion is hollow and the venting needle is held in place by a plug secured in the hollow handle portion. A sliding cap covers the compression spring and is held in place by a hollow pin that connects to the venting needle, which is a hollow cannula. The sliding cap is held in a normally outward position by the compression spring and covers the venting needle. A slot in the sliding cap allows the sliding cap to be moved relative to the hollow pin and back against the compression spring. An opening in the sliding cap is provided so the venting needle may be exposed when the sliding cap is moved against the resistance of the compression spring.

In all of the embodiments, a separate buoyancy device may be attached to the fishing tool. This will allow the fishing tool to be retrieved in case it is dropped in the water.

To use this fishing tool, the hook-removing portion is placed into the mouth of a caught fish and the hook removed. Then, the bladder of the fish is vented by a needle carried by the tool on the opposite from the hook-removing portion. Gas in the fish bladder may be exhausted through the needle if the needle is a hollow cannula.

The invention further comprises a method for catch and release fishing comprising: removing the hook from the mouth of a caught fish with a static hook removing tool: and venting the bladder of the caught fish with a needle attached to the same tool. Venting occurs by inserting a needle into the bladder of the caught fish until the sound of escaping gas is heard. The needle is preferably a hollow cannula.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

DETAILED DESCRIPTION OF THE INVENTION

The hook removal tool of the present invention is preferably made of a non-corrosive material of sufficient strength and rigidity to engage the hook and handle the weight of the fish and the torsional forces generated by the operator while removing the hook. One embodiment is constructed in such a way that the hook can be pushed or pulled as required, dependent upon the location of the hook in the fish's mouth. The hook is engaged in a u-shaped pocket, and force is applied by pushing, pulling, or applying a twisting motion to dislodge the hook from the fish's mouth.

The venting needle is similarly constructed of a rigid non-corrosive material and may be solid or hollow. The hollow construction is preferred since the sound of the escaping gas notifies the operator that sufficient depth of penetration of the fish's bladder has been obtained, thus minimizing the depth of the wound. Both the hook removal tool and the venting needle are mounted to a rigid handle which may be constructed of any robust material, solid or hollow. Since the venting needle is sharp, a method of protecting the needle is provided. The needle may be a retractable configuration or may be fixed in place with a protective cover.

The present invention comprises a dual purpose hook removal tool and venting tool for fish.

FIG. 1 illustrates the preferred embodiment of the present invention, comprising a dual purpose fishing tool. The present invention preferably comprises a rigid handle, solid or hollow, with a hook removal assembly mounted at one end and a venting needle assembly at the other end.

As shown in FIG. 1, the hook removal assembly includes rigid shaft 6, preferably formed of a non-corrosive rigid material, with hook-like elements 7, 8, and 9 formed at the end of shaft 6. Hook-like elements 7, 8, and 9 may be formed by a variety of means such as bending, forging, or welding of additional pieces onto primary shaft 6. Hook-like elements 7, 8, and 9 form a generally "J" shaped configuration. Static hook removers of similar construction with J-shaped hook elements have been in use in fishing for many years, and the origins of such devices are not known. Similar hook removers may be found on numerous commercially available devices. The advantage of this type of hook remover is that it is easy to use and has no moving parts, thus making it a robust tool. More complex devices using similar methods but utilizing various linkages, pivots, and pinions are commercially available. While these devices are functional, they are more complex to use than the tool described herein, and more prone to failure due to the presence of pins, pivots, and other moving parts. In the tool described herein, hook-like elements 7, 8, and 9 engage the fish hook, a twisting motion is applied, and the hook comes out. The hook remover depicted in FIG. 1 is formed by welding additional pieces of material 7 to primary shaft 6 such that hook-like elements 8 and 9 are formed. This configuration is designed as such to utilize the traditional J-shaped hook element as in 9 and the traditional twisting hook removal method, but has the additional capacity for pushing and/or twisting the hook from distal end 8, which is useful in some situations depending on the position of the hook in the fish's mouth. The method used to produce this combined tool provides a compact configuration that fits easily in the fish's mouth.

The hook removal assembly is mounted rigidly to handle 1 of the tool. In the configuration depicted in FIG. 1, handle 1 is hollow, constructed of a tubular material, and mounting plug 5 attaches hook removal assembly 6-9. Attachment methods for plug 5 may include interference fits, cross-drilled pins, threads, bonding adhesives, or other techniques. Plug 5, when positioned in the end of handle 1, provides a sealed end allowing air to be captured inside tubular handle body 1. If the tubular cavity is of sufficient size to displace a weight of water greater than that of the tool, this method provides floatation for the tool.

Hollow hypodermic needle or cannula 3 is attached to the opposite end of handle 1 by plug 12. Similar to plug 5, plug 12 seals the end of tubular handle 1. Solid needles may be employed, but a hollow needle is preferred as shown in FIG. 1. A hole is drilled axially in plug 12 to provide a mounting location for needle 3 and to allow air to pass through the hypodermic needle and out cross-drilled hole 2. Cross drilled hole 2 allows gas from the fish bladder to escape from hollow needle 3. The venting tool is used by grasping the tool by handle 1 and positioning needle 3 in the proper place on the fish for venting, which may vary among different species, and inserting needle 3 into the fish until the trapped gas escapes, producing an audible venting noise. Needle cap or cover 4 is provided to protect needle 3 when it is not being used for venting a fish bladder. As depicted, cap 4 is affixed to plug 12 by screw threads 11 in cap 4 which mate with screw threads 11' on plug 12, although other means such as a snap-on arrangement, bayonet lock, or other means that will keep it in place until it is deliberately removed, may be provided.

Alternatively, instead of fixing needle 3 in position and providing protective cap 4, other means may be employed whereby venting needle 3 is retractable into handle body 1, or cap 4 is moveable to automatically cover needle 3 when the venting function is not in use.

Figure 3:
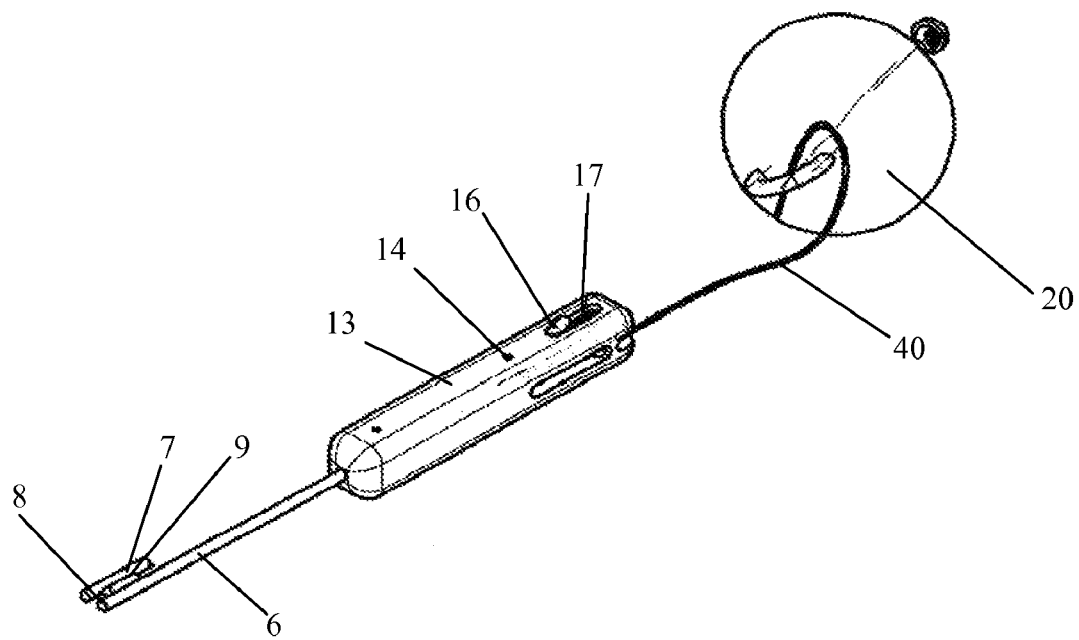
FIG. 3 is an isometric view of another embodiment of the apparatus of the invention.
Figure 4:
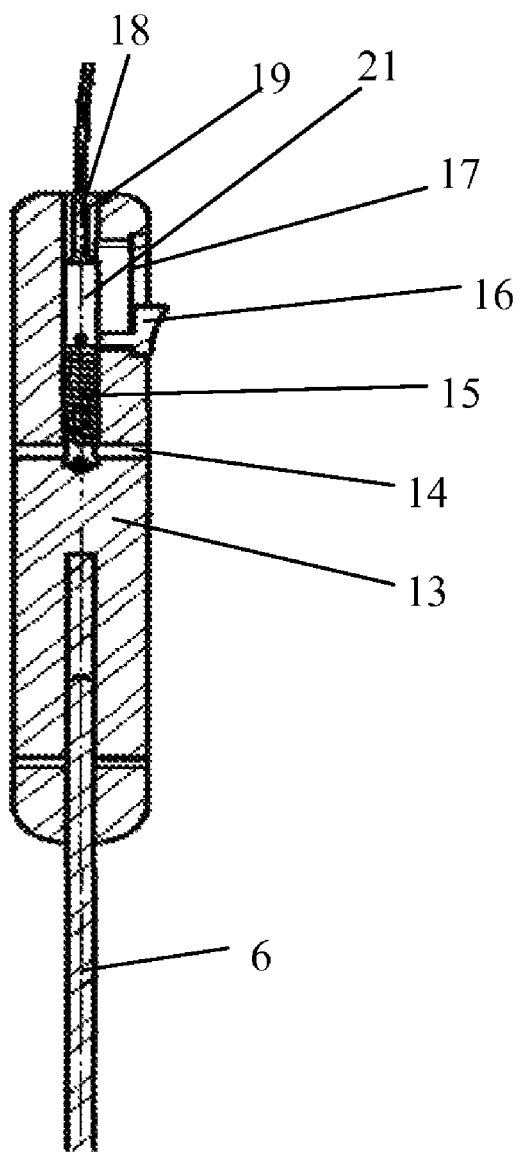
FIG. 4 is a cross-sectional view of the FIG. 3 embodiment.
Figure 5:
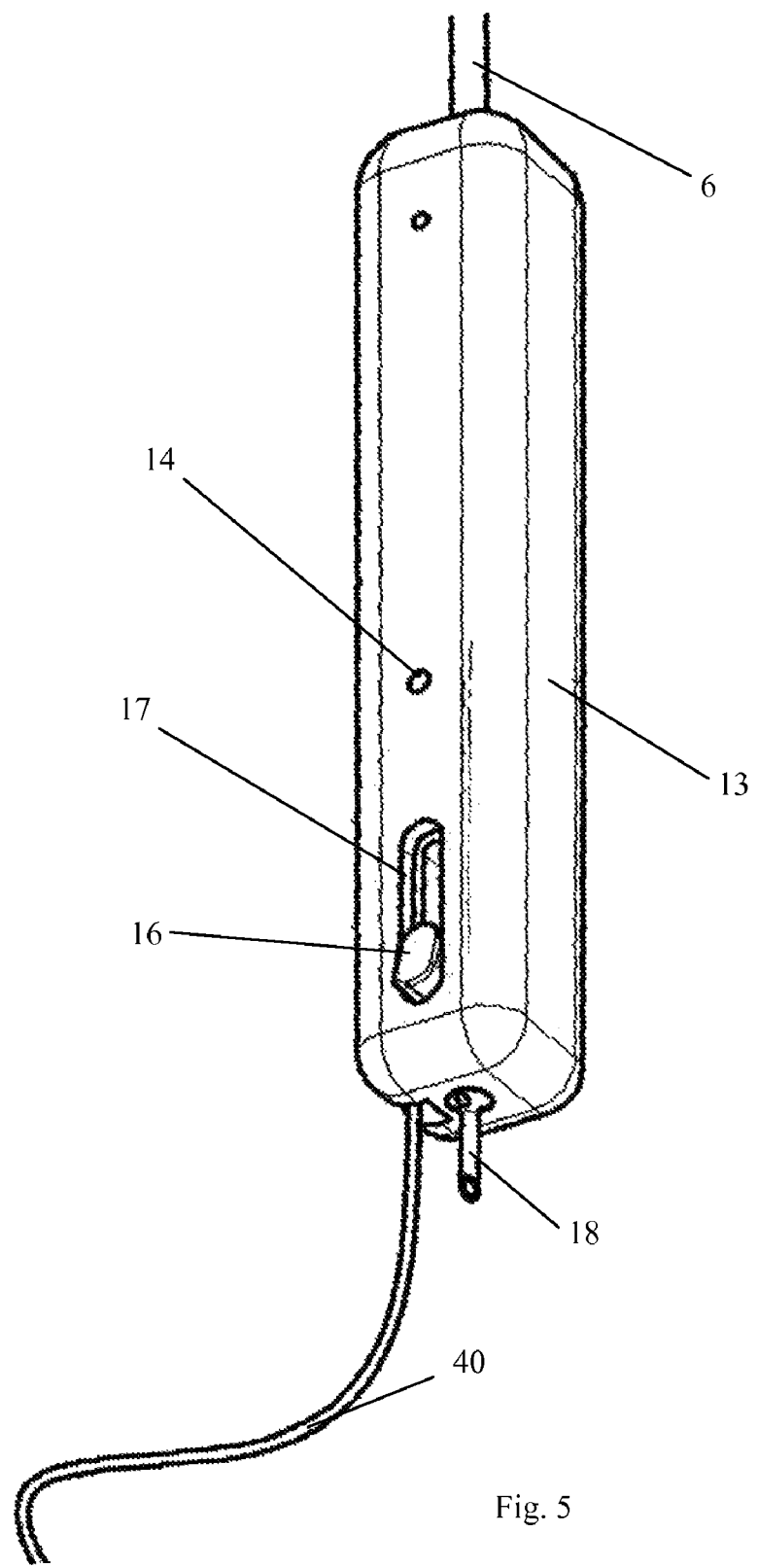
FIG. 5 shows the apparatus of FIG. 3 with a venting needle in the extended position.

A retractable needle configuration is depicted in FIGS. 3, 4, and 5. The same hook removal 6-9 assembly as depicted in the configuration of FIG. 1 is attached to different handle configuration 13. In this configuration the handle is preferably a solid material suitable for machining or molding the features necessary for the retractable needle assembly. As shown in cross-section in FIG. 4, hypodermic needle or cannula 18 is installed in bored hole 19 in the end of handle 13. Needle 18 can be moved in and out of the handle by applying pressure to slide lever 16, which is mounted in slot 17. FIG. 5 shows the device with needle 18 fully extended. Needle 18 is retained by extension spring 15, with one end of spring 15 attached to the handle by fixed pin 14, and the other end of spring 15 attached by sleeve and pin 21 to the end of needle 18. When pressure is removed from slide lever 16, needle 18 is automatically retracted by spring 15 such that the point is protected within handle 13. This configuration of the tool is also shown with float ball or buoyancy device 20 attached to handle 13 by means of cord 40. Float 20 is of sufficient size to provide enough buoyancy to keep the tool from sinking in the event that it is dropped in the water accidentally. The float may also be a spray bottle and serves the dual purpose of containing an antiseptic solution for the purpose of sterilizing the needle assembly between uses.

Figure 6:
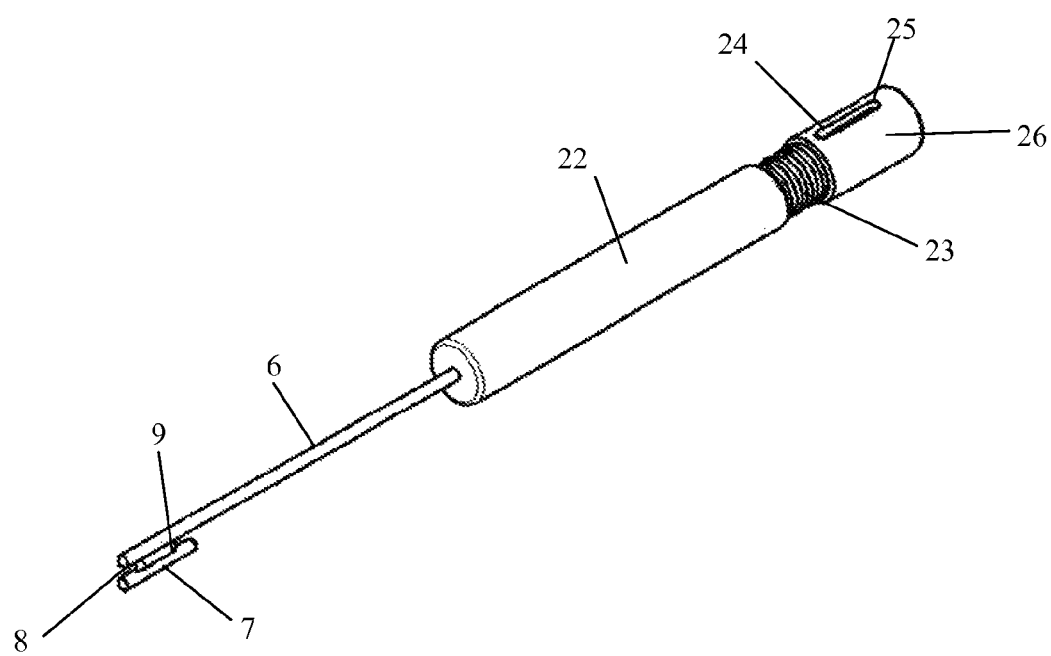
FIG. 6 is an isometric view of yet another embodiment of the apparatus of the present invention.
Figure 7:
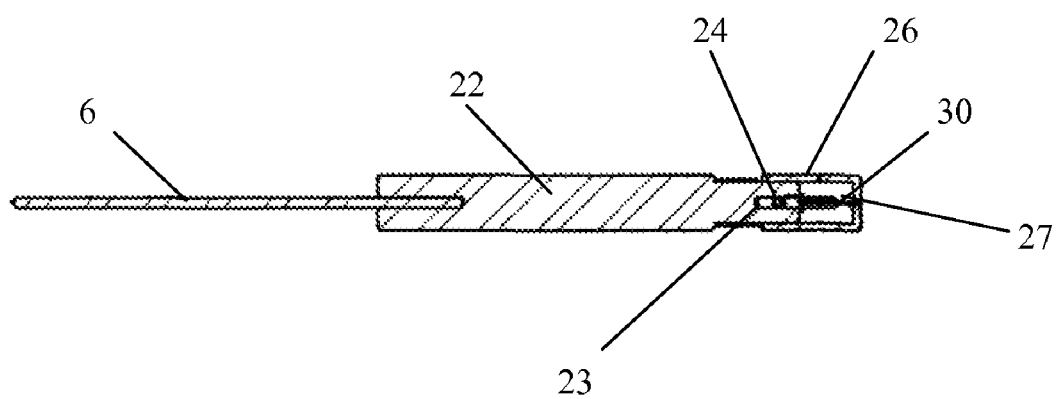
FIG. 7 is a cross-sectional view of the FIG. 6 embodiment.

A fixed needle arrangement with a sliding cover is shown in FIGS. 6 and 7. In this embodiment, hook removal assembly 6-9 shown in FIG. 1 is used. Handle 22 is fitted with compression spring 23. Sliding cap 26 is retained by hollow pin 24 in slot 25. Hypodermic needle 30 is fixed to handle 22 by means similar to those described with respect to the configuration in FIG. 1. Hollow pin 24 is in communication with needle 30 to allow gas from the fish bladder to escape. To use the configuration of FIGS. 6 and 7, the portion of handle 22 carrying needle 30 is placed at the correct location on the side of the fish and force is applied to handle 22. The applied force compresses spring 23 causing cap 26 to slide upwards along handle 22, exposing the needle through hole 27 in cap 26 and causing needle 30 to penetrate the fish. Air escapes through needle 30 and exits the handle through hollow pin 24.

Although several embodiments have been described, it is recognized that other variations exist as regards to features, components, and configurations. It is obvious to those skilled in the art that modifications, additions, and/or deletions may be applied without departing from the spirit and scope of the invention, and that no undue limits should be imposed thereon except as may be set forth in the following claims.

What is claimed is:

1. A fishing tool for fish comprising;
   an elongated handle portion;
   an elongated, rigid shaft, attached to one end of said elongated handle portion, said rigid shaft being smaller in cross section than said elongated handle portion and extending away from said handle portion;
   a plurality of hook-like elements attached to an end of said elongated shaft remote from said handle portion and together with said elongated shaft forming a generally "J" shaped configuration defining a fish hook removing portion, wherein a tip of said "J" shaped configuration extends in a direction toward said elongated handle portion;
   said "J" shaped configuration engageable with a portion of a fish hook when removing the hook from the fish;
   a fish flotation bladder venting needle mounted on an opposite end of said handle portion from said hook removing portion, said venting needle being a hollow cannula for piercing and venting a fish flotation bladder without killing the fish;
   an opening formed in said opposite end of said handle portion where said needle is mounted;
   an extension spring mounted in said opening and held in place by a pin extending through said handle portion at a first end of said spring;
   a sleeve and an other pin attached to a second, opposite end of said spring said needle attached to said sleeve and the other pin, and said spring acting to retain said needle in a normally retracted position within said handle;
   an elongated slot formed in said handle portion and connecting with said opening; and
   a slide lever, movable in said slot, connected to said sleeve for moving said needle in and out of said handle portion.

2. The fishing tool of claim 1 further comprising a buoyancy device attached thereto.

\* \* \* \* \*